United States Patent [19]

Mauerhofer

[11] Patent Number: 5,458,147
[45] Date of Patent: Oct. 17, 1995

[54] DEVICE AND PROCESS FOR THE CONTACTLESS CONTROL OF THE FLOW OF WATER IN A SANITARY APPLIANCE

[75] Inventor: Alex Mauerhofer, Vilters, Switzerland

[73] Assignee: Geberit Technik AG, Jona, Switzerland

[21] Appl. No.: 247,266

[22] Filed: May 23, 1994

[30] Foreign Application Priority Data

Jun. 30, 1993 [CH] Switzerland .................. 1955/93

[51] Int. Cl.⁶ ............................................. F16K 31/02
[52] U.S. Cl. ................... 137/1; 251/129.01; 251/129.04
[58] Field of Search ................ 251/129.04, 129.01; 137/1

[56] References Cited

U.S. PATENT DOCUMENTS

| | | |
|---|---|---|
| 4,767,922 | 9/1988 | Stauffer . |
| 4,962,790 | 10/1990 | Chou et al. .......... 251/129.04 X |
| 5,025,516 | 6/1991 | Wilson ................ 251/129.01 X |
| 5,033,508 | 7/1991 | Laverty .............. 251/129.04 X |
| 5,050,641 | 9/1991 | Shwu-Fen ............ 251/129.04 X |
| 5,142,134 | 8/1992 | Kunkel . |

FOREIGN PATENT DOCUMENTS

| | | |
|---|---|---|
| 0547415A1 | 11/1992 | Germany . |
| 646766 | 12/1984 | Switzerland . |
| 651143 | 8/1985 | Switzerland . |

OTHER PUBLICATIONS

Meinert, Hintergrundausblendung bie Lichttastern, Feinwerktechnik and Messtechnik (no translation).

Primary Examiner—Stephen M. Hepperle
Attorney, Agent, or Firm—McGlew and Tuttle

[57] ABSTRACT

The device has an optical scanning head (3) with a radiation source (17), as well as with a sensor (21). The scanning head (3) transmits a signal toward a background (9, 14), e.g., a washbasin, and receives signals diffusely reflected from that background. The signals (11) received are sent to an electronic control unit (22) for controlling, e.g., a valve (3). The device is arranged, e.g., in the water outlet (2) of a washstand appliance.

20 Claims, 3 Drawing Sheets

DEVICE AND PROCESS FOR THE CONTACTLESS CONTROL OF THE FLOW OF WATER IN A SANITARY APPLIANCE

FIELD OF THE INVENTION

The present invention pertains to a device for the contactless control of water flow in a sanitary appliance such as washing units, urinals or toilets, the contactless control including an optical scanning head as well as to a process for operating such a device. The present invention also pertains to sanitary appliances that can be operated in a contactless manner, especially washstand appliances with a device according to the present invention.

BACKGROUND OF THE INVENTION

Contactless control of the flow of water in a sanitary appliance has been increasingly used now, partly in public facilities for hygienic reasons, and partly to reduce water consumption in general.

Prior-art control systems for the contactless operation of washing units are based on an infrared sensor technology. An infrared transmitter is provided, operating with a constant, possibly pulsed radiation power. The transmitter may be adjusted such that the washstand basin is not detected by an infrared receiver operated at an adjustable sensitivity. An object located in the intermediate space, e.g., a body part, especially a hand, is detected.

Such a device has become known in the state of the art from, e.g., CH-A-646,766. This device has an infrared light scanner, which can be operated in a contactless manner and is installed in a water outlet. When an object is introduced into the zone detected by the light scanner, the latter will respond. The detected area in this device is the overlapping area between the transmission lobe and the reception lobe. The transmitted power of the infrared radiator is constant.

The power consumption is relatively high in this device, but this causes no problem in the case of power supply. It is necessary to accurately adjust the detected area at the time of the installation. In addition, it is disadvantageous that the detected area depends on the degree of reflection of the object. Consequently, if an existing background must be masked, one is forced, in the case of a well reflecting background, e.g., a wash basin, to correspondingly limit the range of the system, which leads to an undesired limitation of the detected area.

An electronic control device for the contactless control of the flow of water has become known from CH-A-651,143. This includes two signal transmitters, arranged at spaced locations from one another and operated according to a triangulation process. One particular disadvantage of this device is the fact that it rules out the possibility of miniaturization. The size of the device precludes the accommodation in the water outlet of a washstand appliance. Adjustment operations are to be performed by the installer of the sanitary appliance in this case as well.

The electronic control systems that are currently used for sanitary appliances that can be operated in a contactless manner require, in general, a power supply. This is as a consequence of their high power consumption, which is inherently associated with the system. This makes retrofitting difficult or impossible and, in the case of new installation, it causes installation costs which often exceed those of the control system itself.

The electronic control system of modern sanitary appliances, especially washing units, is operated from a battery for these reasons, and it is completely integrated, together with the battery, in the washstand appliances in an installation-friendly manner.

However, practical battery operation is possible only when the system is able to operate with an extremely low power consumption. Complete integration of the electronic control system, including the battery, in, e.g., a washstand appliance is, in turn, possible, for aesthetic reasons, only if the electronic system and the infrared optical system can be extensively miniaturized.

SUMMARY AND OBJECTS OF THE INVENTION

It is an object of the invention to provide a washstand appliance operating in a contactless manner which is able to be installed on all commercially available washbasins without special adjustment operations, and will always have an optimal detection area for recognizing a person's hand.

It is further an object of the invention to provide control functions of a modern washstand appliance which accommodate the user's intentions to the extent possible, i.e, the washstand appliance must have a certain "intrinsic intelligence."

It is the primary object of the present invention to provide a device of the type described above, which makes possible a long battery life due to its very low-current drain operation and which automatically adapts itself to a background, e.g., different shapes and materials of washstands, while maintaining an optimal detection area for the recognition of an object or a hand.

The invention provides a contactless control particularly of water flow in a sanitary appliance such as washing units, urinals and toilets. The contactless control uses an optical scanning head with a radiation source as well as a sensor, the scanning head transmits signals directed toward the background and the sensor receives a signal diffusely reflected from the background and sends it to an electronic control unit for controlling a valve arranged in a pipe.

The device according to the present invention comprises an infrared light pulse transmitter, an infrared receiver with threshold value amplifier, as well as an electronic control unit. The radiation power or magnitude of the infrared light pulse transmitter of the device is variable by the electronic control unit. This makes it possible to determine the minimum radiation power of the infrared light pulse transmitter that is needed to detect a given object, at constant sensitivity of the infrared receiver equipped with a threshold value amplifier. This minimum radiation power will hereinafter be called the detection power. Since this depends on both the reflection properties and the distance between the object and the transmitter/receiver system, different characteristic values of this detection power will be obtained for the dry or water-filled washstands, for a hand or any other objects. The detection power is continuously adapted to the background or a changing object in the device according to the present invention, so that the objects located in the detected area can additionally be identified as immobile or moving objects if the detective power is varying.

The information thus obtained is used in the process according to the present invention by, e.g., a microprocessor for the "intelligent" control of the flow of water in a washing unit, but also for the low-current drain monitoring of the state of rest as well as for the automatic adaptation to different shapes and materials of the wash basin of such appliances.

Among other things, a successive approximation process, which has been known as such, is suitable for determining or adapting the detection power. It makes it possible to determine the detection power at a low technical effort and at nearly any accuracy. Starting from half of the maximum possible radiation power, the radiation power of the infrared light pulse is increased or decreased at decreasing, binarily weighted power increments continuously and depending on the output signal of a threshold value amplifier located in the infrared receiving channel. The process supplies the detection power directly in binary-coded form.

A sanitary appliance is in the state of rest during more than 97% of the overall operating time. During this state of rest, the detected area must be continuously monitored for an object that may enter this zone, e.g., a hand in the case of washing units. It is therefore decisive for the life of the battery that the active object or hand recognition function should operate at the lowest possible battery power consumption during this rest time. The process according to the present invention, which will be described below, makes possible object or hand recognition with an especially low current drain during the phase of rest.

The microprocessor and the entire electronic system are in a low-current drain "sleep mode," without any outwardly directed activity. After expiration of a time delay of a few tenths of one second, the microprocessor "wakes up" by means of its "watchdog" function, and monitors the "presence" of the background or of the washbasin by means of two transmitted infrared pulses in the microsec range, which correspond, with their radiation power, to the upper and lower tolerance limits of the previously stored detection power of the washbasin. This process lasts a very short time, e.g., a fraction of one millisec.

The background or the washbasin must be detected by the infrared receiver at the upper value of the radiation power, but it must not be detected at the lower value. The background of the washbasin is thus identified, and the microprocessor returns into the "sleep mode," without opening the flow of water. The background or the washbasin is, in a way, "masked" with regard to the control of the flow of water.

If the background or the washbasin is detected at both values of the radiation power, this means that the detection power of the background or of the washbasin can no longer be identified; another object, e.g., a hand, is now obviously in the detected area. This object is now identified by determining and analyzing its detection power, which may be variable, and the flow of water is immediately opened if an object or hand is recognized.

Using a commercially available lithium battery (eg. one used for inexpensive cameras), an operating time exceeding 2 years with 200,000 washing processes can be guaranteed with this reliably operating process for a washstand appliance that can be operated in a contactless manner.

The process according to the present invention includes the background, the washbasin in the case of washing units, in the measurement process. The process it automatically makes the washbasin the background. To do so, the detection power of the background or washbasin is measured at the beginning of the phase of rest. This detection power is provided with suitable tolerance limits, and stored. As was mentioned, this process makes possible the recognition of an object or hand during the phase of rest at a low current drain, but at the same time it eliminates the need for adjustment operations during the installation and putting into operation of the unit with different background properties, e.g., in different washstand models. Yet, the process described ensures that the detected area for object and hand recognition always extends to the background, i.e., to the inside of the washbasin in the case of the washing units.

The device according to the present invention is particularly suitable for a washstand appliance, because the optoelectronic scanning head can be designed with very small dimensions and can be arranged in the slender appliance head behind the aerator. However, it can also be used to control other sanitary appliances, e.g., urinals or toilets.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
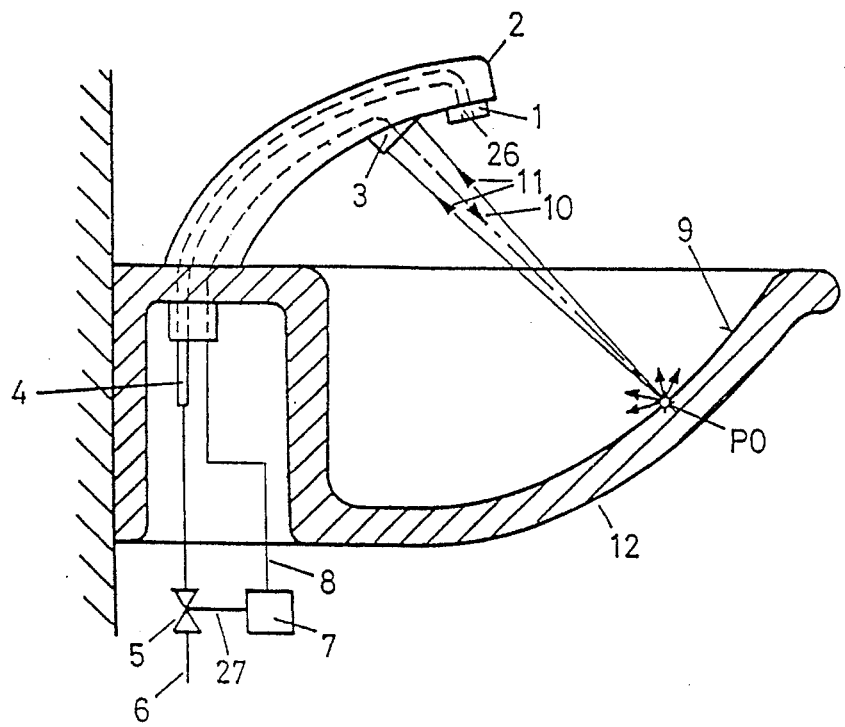
FIG. 1 is a schematic and partially sectional view of a washing unit with washbasin and washstand appliance, which contains a device according to the present invention.
Figure 8:
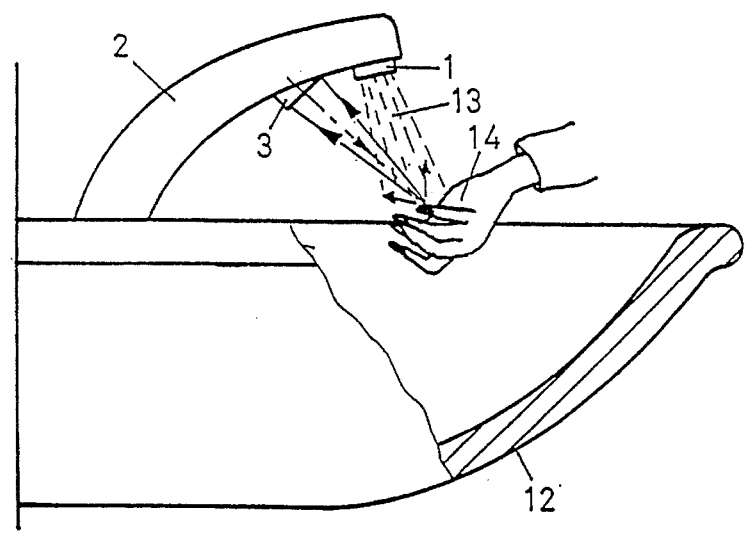
FIG. 8 is a partially sectional view showing washing units with a moving object in the detected area of the device according to the present invention.

FIG. 1 shows a washstand appliance 25, which is mounted on a washbasin 12, and which has, at the upper end, a water outlet 2, which consists of an aerator 1 with an opening 26. The aerator 1 is connected to a water pipe 4, which in turn is connected via a solenoid valve 5 to a water supply line 6. The aerator 1 is directed toward an inside 9 of the washbasin 12 and may additionally contain a flow governor for the water jet 13 (FIG. 8). In addition, a scanning head 3, which is connected to an electronic control device 7 via a signal line 8, is arranged at the water outlet 2 under the aerator 1.

The electronic control device 7 contains a replaceable 2CR5/6V lithium battery, not shown here, and is in turn connected to the bipolar "low power" solenoid valve 5 via a line 27. Other prior-art power sources, such as a power supply, batteries with and without solar cell charging, etc., are, of course, also possible, besides the battery power supply shown here.

Figure 2:
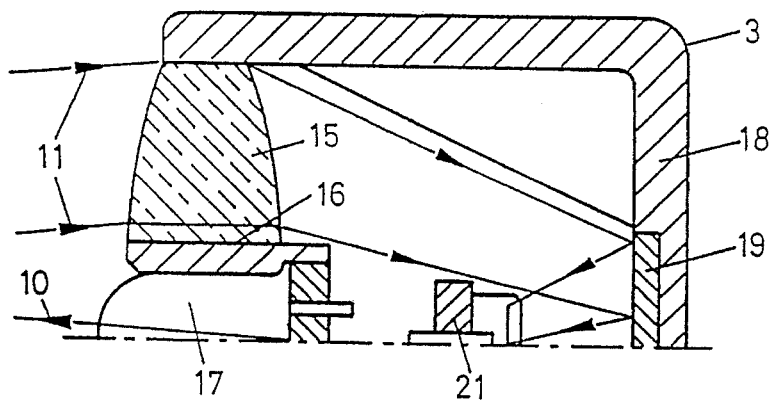
FIG. 2 is a partial sectional view through an optoelectronic scanning head according to the invention.

The optoelectronic scanning head is represented in detail in FIG. 2. It comprises a cylindrical housing 18, in which an annular lens 15 is fastened. The annular lens 15 in turn contains an infrared transmitting LED 17 in an axial hole 16. The LED 17 forms a radiation source for infrared light pulses 10, which are directed toward the inside 9 of the washbasin 12 in the device according to FIG. 1. The infrared light pulses 10 are diffusely reflected on the inside 9 of the washbasin. Part of this reflected radiation 11 reaches the annular lens 15, which collects the radiation 11 and directs it toward an infrared photodiode 21, which is mounted coaxially to the annular lens 15 in the housing bottom 18.

Figure 3:
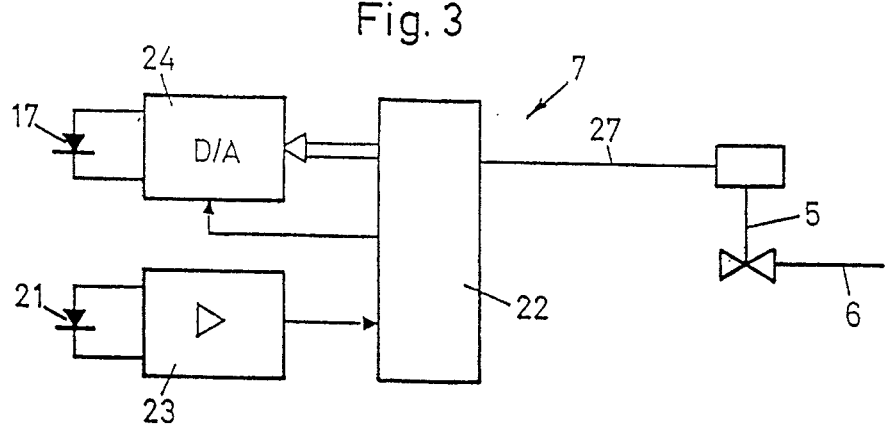
FIG. 3 is a block diagram of an electronic circuit according to the invention.

As is shown in FIG. 3, the infrared photodiode is followed by a threshold value amplifier 23 with constant, permanently preset amplification factor. Controlled by a microprocessor 22, the pulse current of the infrared transmitting LED 17, lasting ca. 5 μsec, can be varied by means of a simple 7-bit D/A converter 24 at a ratio of 1:127. The detection power or the detected area of the system can thus be varied by fine increments within broad limits.

Figure 4:
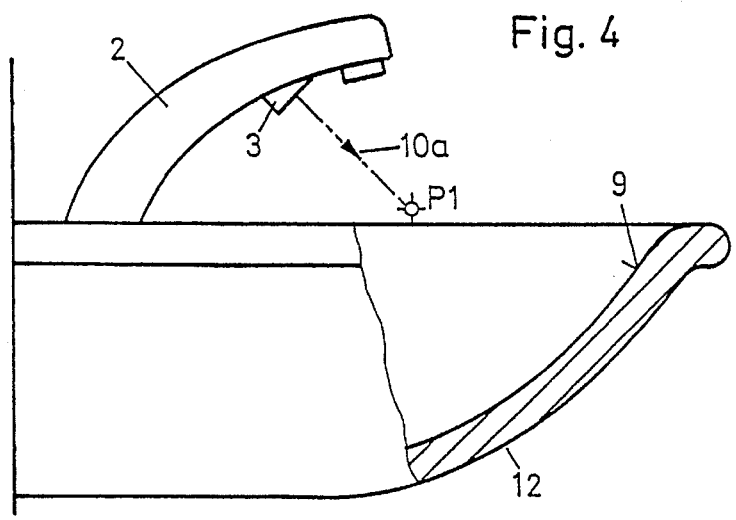
FIGS. 4 through 6 are partially sectional views of the device according to FIG. 1 during the transmission of infrared light pulses of various radiation intensities.

FIG. 4 shows an infrared light pulse 10a, which is emitted by the scanning head 3 and whose radiation power corresponds to a detected area of the washbasin up to the point P1 with reference to the reflection properties of the inside 9 of the washbasin 12. In other words, if the inside of the washbasin 12 were located between the scanning head 3 and the point P1, the threshold value amplifier 23 (FIG. 3) would respond. However, since the reflection surface of the washbasin is outside its detected area, the threshold value amplifier 23 (FIG. 3) will not respond.

Figure 5:
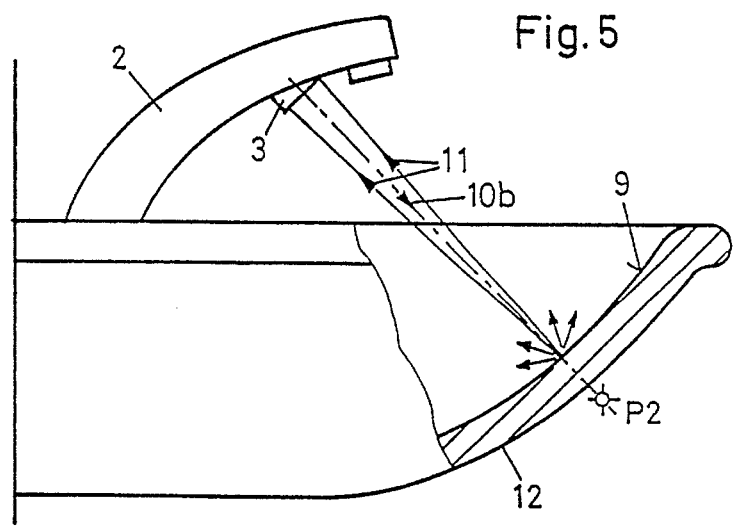

FIG. 5 shows a situation comparable to that shown in FIG. 4. The infrared light pulse 10b emitted by the scanning head 3 was, however, considerably increased with regard to its radiation power, which now corresponds to a detected area of the washbasin up to point P2. Since the reflection surface of the washbasin is within its detected area here, the threshold value amplifier 23 (FIG. 3) will now respond.

Figure 6:
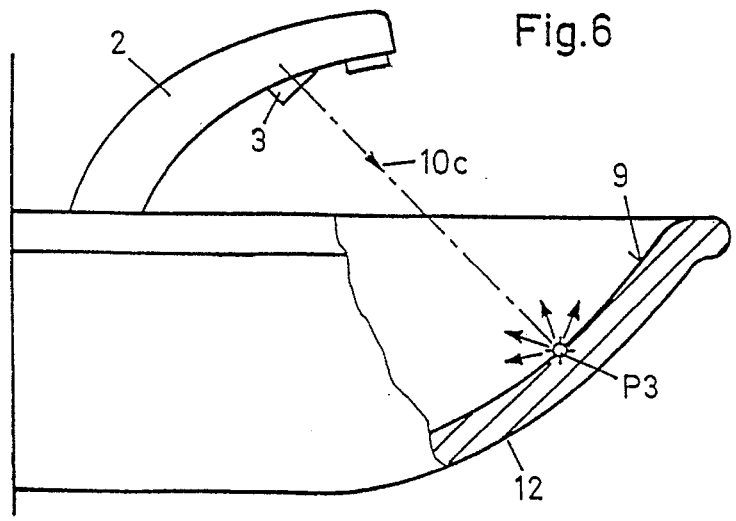

FIG. 6 shows a situation comparable to that shown in FIGS. 4 and 5. However, the infrared light pulse 10c emitted by the scanning head 3 has a radiation power that corresponds to a detected area of the washbasin up to point P3. Since P3 is located exactly on the inside 9 of the washbasin 12, this radiation area corresponds to the detection power of the washbasin.

Figure 7:
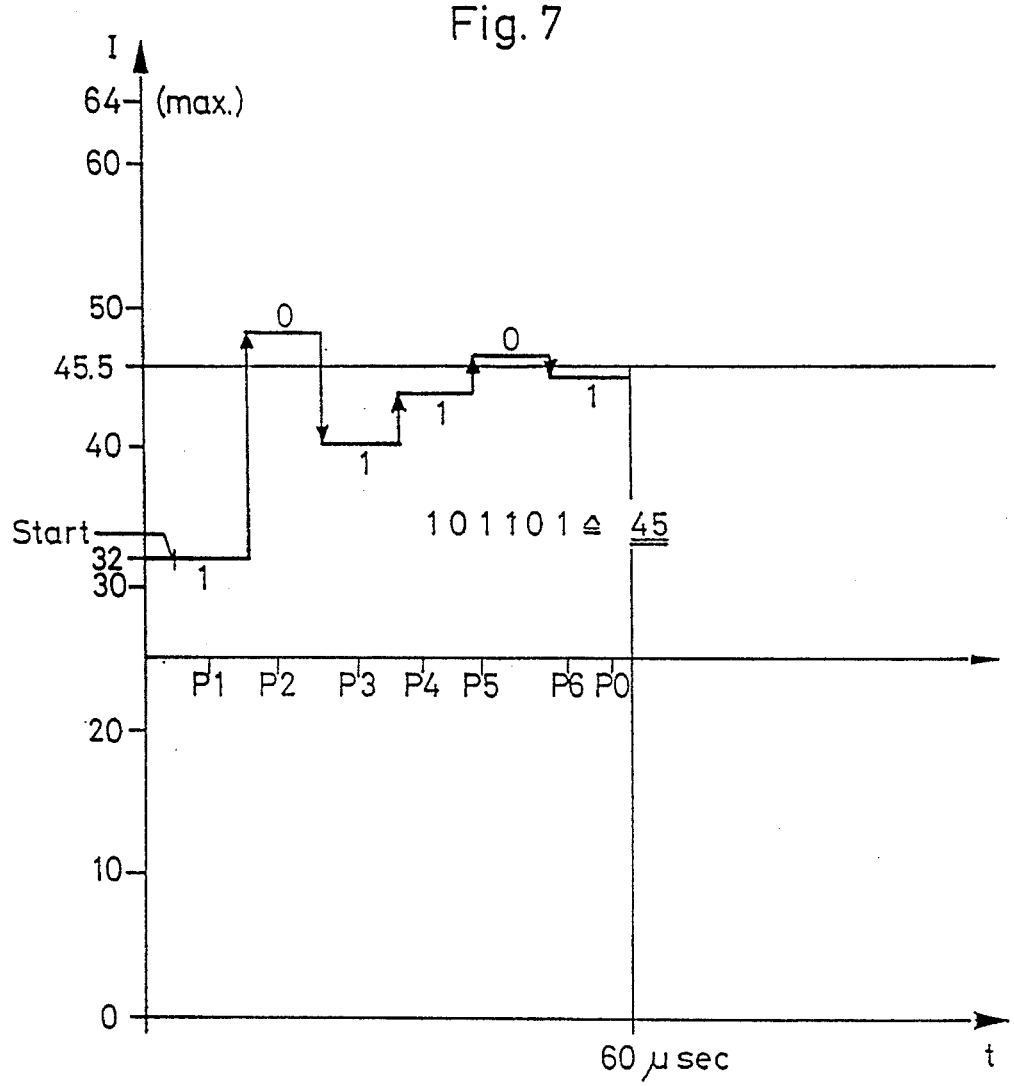
FIG. 7 is a representation of the different infrared radiation powers during a successive approximation.

To determine the detection power of the washbasin, which belongs to the point P3, the process uses the successive approximation method here. Starting from half the value of the maximum possible radiation power, the radiation power of the infrared light pulse is changed to the lowest possible power increment in binarily weighted, decreasing power increments, continuously and depending on the response of the threshold value amplifier 23 (FIG. 3). As is shown in FIG. 7, the binary-coded value of the detection power is directly determined by this method for the inside 9 of the washbasin 12 with a total of 7 infrared light pulses.

The value of the detection power thus determined for the inside 9 of the washbasin 12 is provided with an upper tolerance limit To and a lower tolerance limit Tu and is stored in the RAM of the microprocessor 22 (FIG. 3).

The device now passes over into the so-called state of rest. To do so, the microprocessor passes over into a low-current drain mode, the so-called "sleep mode," and it switches off the entire electronic control system. The microprocessor is again "woken up" by its "watchdog" timer after, e.g., 0.3 sec. Now, it immediately sends two infrared light pulses of a length of 5 μsec each, with the radiation powers of the tolerance limits To and Tu stored. If the threshold value amplifier 23 (FIG. 3) responds at the upper tolerance limit To, but not at the lower tolerance limit Tu, the washbasin 12 is thus identified. The system again passes over into the state of rest.

If the threshold value amplifier 23 (FIG. 3) responds at both tolerance limits To and Tu, or if it fails to respond at both, an object with a different detection power is obviously located within the detected area of the washbasin. The system immediately determines the detection power of this object by successive approximation, and continuously adapts it. If it is determined, as is shown in FIG. 8, that it is a moving object, e.g., a hand, the flow of water of the washstand appliance is opened.

The flow of water from the washstand appliance 25 is again closed as soon as the adjusted detection power is within the tolerance limits To and Tu for at least 2 sec, which means that the washbasin 12 is now identified.

With the background monitoring process proposed, the device according to the present invention has a minimal power consumption during the phase of rest, which accounts for 97% of the operating time. The short pulse length of the infrared light pulse, equaling, e.g., 5 μsec, which is made possible by the process proposed, the small number of such pulses, which are needed by the successive approximation method to determine the detection power or to recognize a hand, as well as the incidence of a large amount of light, which is ensured by the use of the annular lens 15 of great light transmitting capacity in the optoelectronic scanning head, are also advantageous in terms of power consumption. A commercially available 2CR5/6V battery therefore makes possible an operating time of at least 2 years with 200,000 washing processes.

By including the reflection surface of the washbasin in the hand recognition process, the so-called masking of the background, automatic adaptation to different shapes and materials of the washbasin is achieved at the same time. Thus, all adjustment operations during the installation and putting into operation of the device are eliminated. Nevertheless, rapid and reliable recognition of a hand with a detected area extending to the bottom of the washbasin is guaranteed.

The device according to the present invention and especially the optoelectronic scanning head can be prepared from inexpensive, commercially available, miniaturized components. They are therefore suitable for sanitary appliances of any type, e.g., for urinals and especially for washstands, where the entire device is preferably accommodated in the washstand appliances. Other arrangements are, of course, possible as well, e.g., parts of the device may be arranged in a covered recess of the washstand.

While a specific embodiment of the invention has been shown and described in detail to illustrate the application of the principles of the invention, it will be understood that the invention may be embodied otherwise without departing from such principles.

What is claimed is:

1. A device for contactless control of water flow, the device comprising:

an optical scanning head including a radiation source means for transmitting radiation pulses toward a background, said optical scanning head also including a sensor means for detecting the radiation pulses reflected from the background;

a water supply means for supplying water, said water supply means including a controllable valve;

control means for receiving a signal from said sensor means indicating detection of the reflected pulses, said control means also being connected to said radiation source means for controlling when said radiation source means emits the radiation pulses and for controlling a magnitude of the emitted pulses, said control means having a detection mode, in said detection mode said control means repetitively establishing a minimum magnitude of said emitted pulse needed for said sensor means to detect a reflected pulse, said control means determining if said repetitively established minimum magnitudes are caused by a moving or immobile object, said control means opening said controllable valve if said repetitively established minimum magnitudes are caused by a moving object.

2. Device according to claim 1, wherein said control means includes a microprocessor.

3. Device according to claim 1, wherein said control means evaluates changes in said minimum magnitude for controlling said valve.

4. Device according to claim 1, wherein said control means adjusts said magnitude of said emitted pulse using a successive approximation method to determine said minimum magnitude.

5. Device according to claim 1, wherein said scanning head transmits and receives pulses in the near infrared range.

6. Device according to claim 5, wherein said scanning head has a receiving lens of high light transmitting capacity, and said radiation source means is arranged in a hole of said receiving lens.

7. Device according to claim 6, wherein said sensor means is arranged behind said receiving lens, and positioned coaxially with said receiving lens.

8. Device according to claim 7, wherein said sensor means is arranged in front of a mirror.

9. Device according to claim 1, wherein said radiation source means is an infrared LED and said sensor means is a photo diode.

10. Device according to claim 1, wherein said sensor means is connected to a threshold value amplifier.

11. Device according to claim 1, wherein said pulses have a transmitted pulse width of a plurality of μ seconds.

12. Device according to claim 1, wherein said scanning head is arranged close to an outlet nozzle of said water supply said scanning head contains, in a coaxial arrangement, said radiation source, a receiving lens, and said sensor means.

13. A device in accordance with claim 1, wherein:

said control means also establishes another magnitude of said emitted pulses at which said sensor means will not detect the reflected pulses, at a beginning of said detection mode said control means emitting a first pulse at said minimum magnitude and a second pulse at said another magnitude as both were established from a previous detection mode, if said sensor means detects said first pulse and not said second pulse, said control means begins a sleep mode where the pulses are not emitted, after a predetermined time in said sleep mode said control means begins another detection mode.

14. A device in accordance with claim 13, wherein:

said control means establishes said another magnitude at a value less than said minimum magnitude by a predetermined amount, and said first pulse is emitted at a magnitude greater than said minimum magnitude by another predetermined amount;

said control means determines the object is moving if said minimum magnitude is variable.

15. A process for contactless control of water flow, the process comprising the steps of:

emitting a plurality of pulses;

detecting said pulses after said pulses are reflected off an object;

establishing a minimum magnitude of said plurality of pulses needed to detect said reflected pulses;

emitting first and second pulses after establishing said minimum magnitude and determining if said minimum magnitude has changed by more than a predetermined tolerance;

emitting none of said pulses for a predetermined time if said minimum magnitude is within said predetermined tolerance; performing object recognition if said minimum magnitude is outside said predetermined tolerance.

16. A method in accordance with claim 15, wherein:

said first pulse is emitted at a magnitude greater than said minimum magnitude, and said second pulse is emitted at a magnitude less than said minimum magnitude;

said change in said minimum magnitude is determined if reflected pulses are received from either of both said first and second pulses, or none of said first and second pulses.

17. A method in accordance with claim 15, wherein:

said object recognition is performed by repetitively establishing additional minimum magnitudes and determining if the object is moving or immobile; and the water flow is begun if the object is moving.

18. A method in accordance with claim 17, wherein:

the object is determined to be moving if said minimum magnitude varies during said object recognition.

19. A method in accordance with claim 15, further comprising:

reemitting said first and second pulses after said predetermined time to determine if said minimum magnitude has changed by more than said predetermined tolerance;

again emitting none of said pulses for another predetermined time if said minimum magnitude is within said predetermined tolerance;

again performing object recognition if said minimum magnitude is outside said predetermined tolerance.

20. Device for contactless control of water flow in a sanitary appliance such as washing units, urinals and toilets, comprising:

an optical scanning head providing a radiation source as well as a sensor, the radiation source transmitting signals toward a background, and the sensor receiving a signal diffusely reflected from said background, said scanning head having a receiving lens of high light transmitting capacity, said radiation source being arranged in a hole of said receiving lens, said sensor being arranged behind said receiving lens, and said sensor being positioned coaxially with said receiving lens;

a water pipe for supplying water including a controllable valve; and electronic control unit means for receiving signals from said sensor and for controlling said valve, said electronic control unit means measuring a minimum detection power of said radiation source and adapting said minimum detection power to reflection properties of said background.

\* \* \* \* \*